(12) United States Patent
Dasso

(10) Patent No.: US 6,782,780 B2
(45) Date of Patent: Aug. 31, 2004

(54) METHOD AND APPARATUS FOR COOLING MACHINE TOOLS

(75) Inventor: Paul F. Dasso, Falls City, OR (US)

(73) Assignee: Climax Portable Machine Tools, Inc., Newberg, OR (US)

( * ) Notice: Subject to any disclaimer, the term of this patent is extended or adjusted under 35 U.S.C. 154(b) by 53 days.

(21) Appl. No.: 10/080,916

(22) Filed: Feb. 22, 2002

(65) Prior Publication Data

US 2002/0134100 A1 Sep. 26, 2002

Related U.S. Application Data

(60) Provisional application No. 60/271,221, filed on Feb. 23, 2001.

(51) Int. Cl.[7] .............................. B23B 1/00; B23B 5/08

(52) U.S. Cl. ............................................ 82/1.11; 82/113

(58) Field of Search ....................... 82/1.11, 113; 173/1, 173/219; 451/344

(56) References Cited

U.S. PATENT DOCUMENTS

| | | | | |
|---|---|---|---|---|
| 3,832,772 A | * | 9/1974 | Sumida | 30/392 |
| 4,125,968 A | * | 11/1978 | Mackey | 451/344 |
| 5,228,523 A | * | 7/1993 | Rahm | 173/219 |
| 5,775,439 A | * | 7/1998 | Biek | 173/1 |

* cited by examiner

*Primary Examiner*—Willmon Fridie, Jr.
(74) *Attorney, Agent, or Firm*—Dellett & Walters

(57) ABSTRACT

A machine tool and method provides integral cooling to the tool, by employing exhaust air from the drive motor. The exhaust air is suitably allowed to expand within the body of the tool, advantageously cooling the tool.

20 Claims, 4 Drawing Sheets

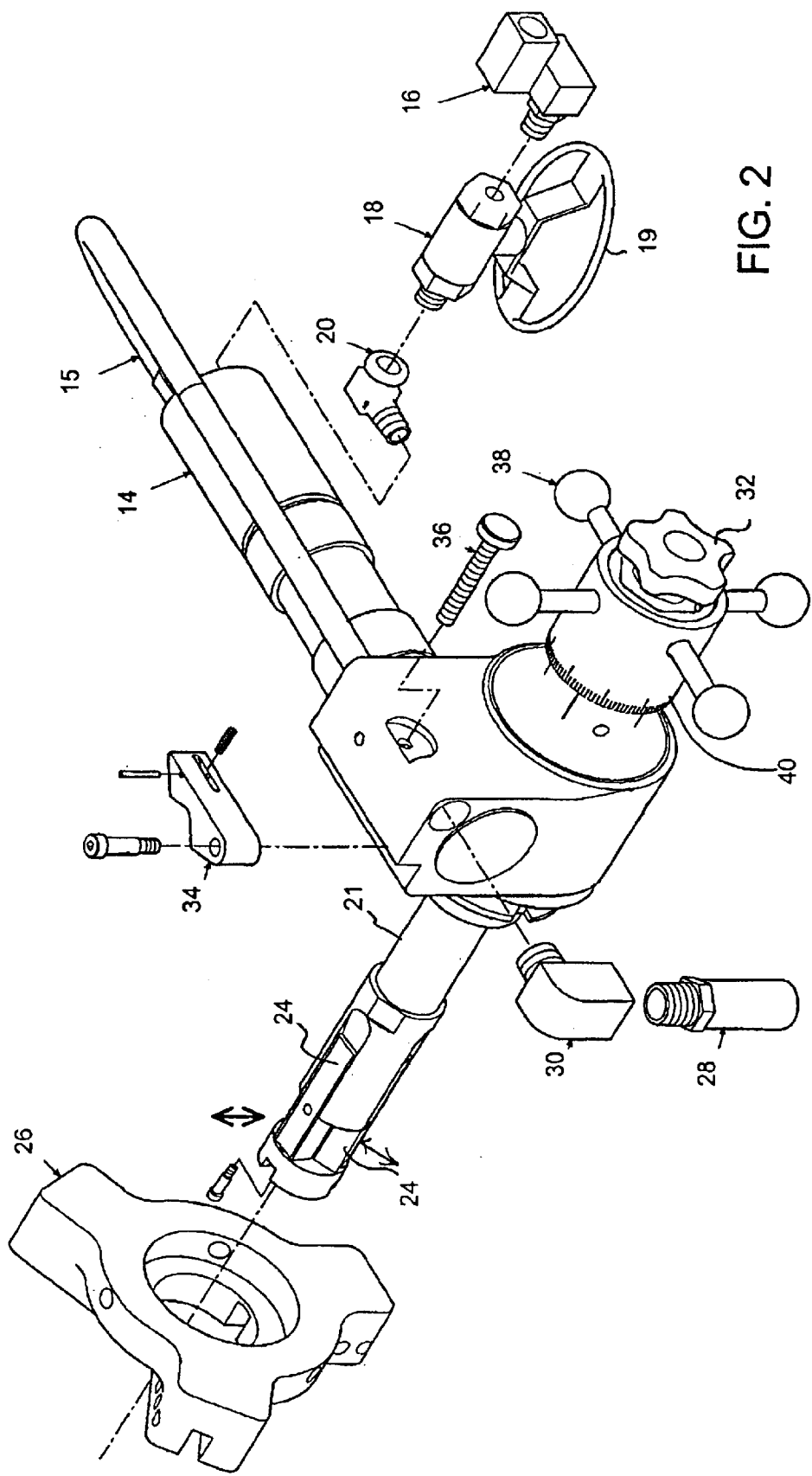

Facing head

Beveling head

METHOD AND APPARATUS FOR COOLING MACHINE TOOLS

BACKGROUND OF THE INVENTION

This invention relates to machine tools, and more particularly to methods and apparatus for cooling machine tools.

When using machine tools, the tool will naturally generate heat when in operation. As the tools are designed to be more compact and lighter weight, generated heat becomes more of an issue. Thus, it becomes desirable to have some provision for cooling the tool, so that it may be operated for longer periods of time without having to stop to allow the device to cool.

SUMMARY OF THE INVENTION

In accordance with the invention, a machine tool, suitably pneumatically powered, uses exhaust air from the air motor to cool the machine tool.

Accordingly, it is an object of the present invention to provide an improved machine tool that is advantageously cooled by use of exhaust air from the driving motor.

It is a further object of the present invention to provide an improved method of cooling a machine tool using exhaust air from the tool's drive motor.

It is yet another object of the present invention to provide an improved machine tool cooling system.

It is another object of the invention to provide an improved portable machining assembly having enhanced cooling features.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 2 is an exploded perspective view of the machine tool;

DETAILED DESCRIPTION

The system according to a preferred embodiment of the present invention comprises a portable machining assembly that employs exhaust air from the air motor driving the device to provide enhanced cooling of the device.

Figure 1:
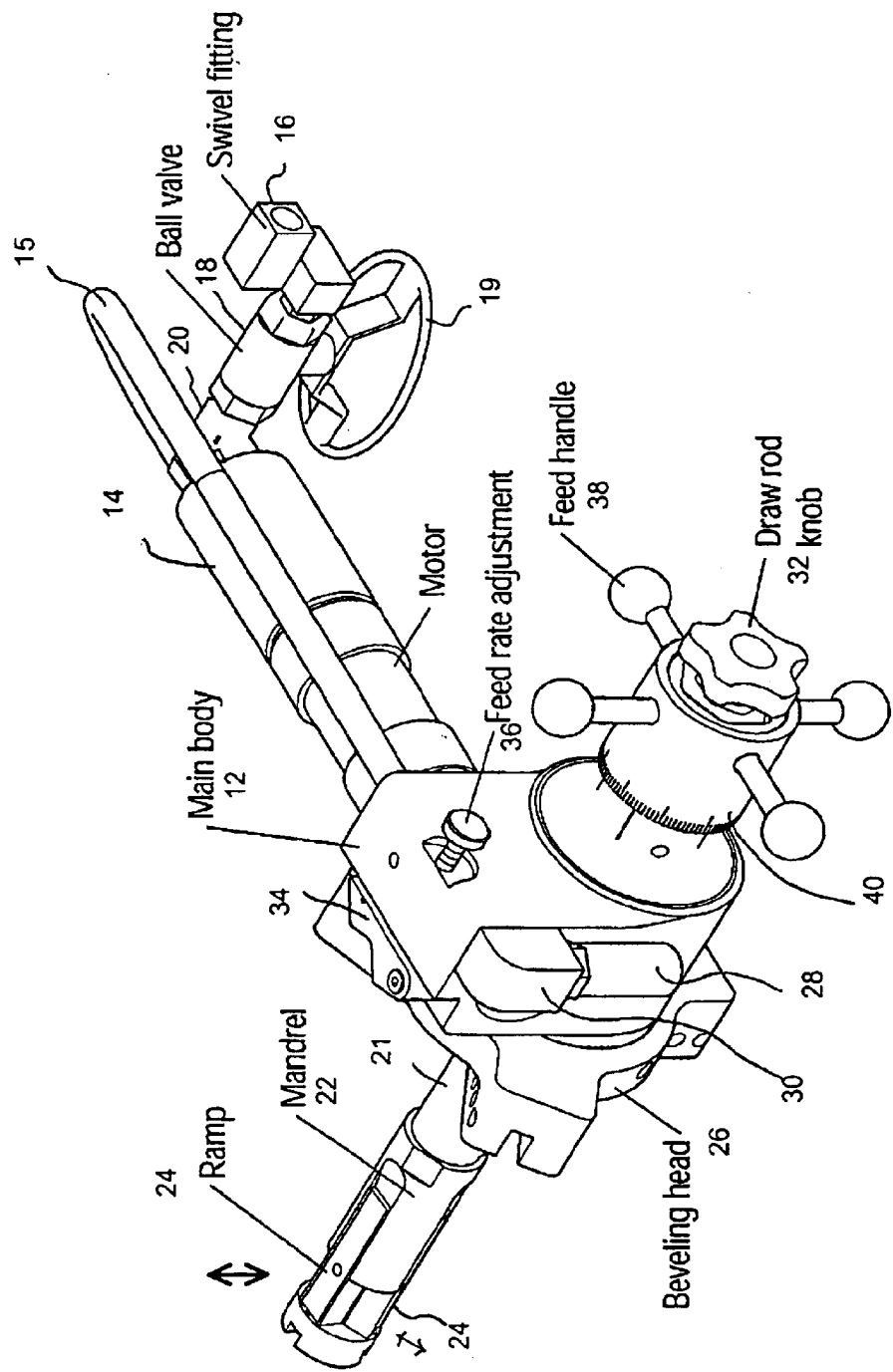
FIG. 1 is a perspective view of a machine tool in accordance with the invention.

Referring to FIG. 1, a perspective view of a machine tool according to the invention, the tool comprises a main body 12 to which other components are mounted. An air motor 14 extends to one side of the main body, with an air cooling tube 15 extending between the exhaust port of the motor and the main body. The air motor receives input driving air from a pressurized air supply (not show) via a swivel fitting 16, valve ball 18 and fitting pipe 20, which communicates the air supply into the motor for driving thereof.

A draw rod 21 carrying a mandrel 22 extends from the main body 12, and includes extensible ramps 24 thereon, suitably 3 such ramps being provided, spaced radially 120 degrees apart around the mandrel. A beveling head 26 is removably mountable to the main body and carries plural tool mounting sites thereon to receive tooling bits.

On the side of the main body opposite where the air cooling tube 15 attaches, an air muffler is provided, in communication with the interior of the main body via a fitting elbow 30.

At the end of the draw rod opposite the mandrel and ramps, on the opposing side of the main body, a draw rod knob 32 is provided, rotatable to extend or retract the ramps 24 for mounting the device to a work piece location.

Mounted atop the main body, near the side carrying the beveling head, is a feed lever 34 which cooperates with feed rate adjustment screw 36 (suitably extending through the main body from the opposite side, so as to adjustably engage the feed lever.

Feed handles 38 are mounted to a nut barrel 40, the nut barrel being normal to the longitudinal axis of the mandrel/draw rod.

In operation, the device is mounted to a work piece by insertion of the mandrel into an opening within the work piece, and clockwise rotation of the draw rod knob 32, which causes the ramps 24 to extend outwardly, radially, so as to engage the interior surface of the opening in the workpiece. To assist in providing a tightened engagement of the ramps with the workpiece, the draw rod knob suitably has a hexagonal nut like shape at one end that cooperates with a correspondingly shaped recess in the nut barrel. The knob is slightly biased outwardly so that in absence of pressing by an operator, the knob is not engaged with the opening in the nut barrel. Thus, the knob may be depressed so as to engage with the opening in the barrel, whereby the feed handles may be used to assist in tightening the draw rod so as to thereby tighten the engagement with the workpiece.

Prior to mounting the device to the work piece, the beveling head would be suitably mounted to the main body. Cutting bits are mounted to the beveling head as desired to accomplish the particular objective.

By rotation of the feed handles and the attached nut barrel, the main body will translate along the mandrel, so as to move closer to the work piece for initial positioning prior to applying power.

When a beveling or facing operation is to begin, the air supply is attached to the swivel fitting, and the ball valve is then opened (by operation of handle 19) to supply air to the motor. The drive power of the motor causes the beveling head to rotate, and, depending on the adjustment of the feed screw 36, the feed lever 34 will be engaged by the rotating beveling head, so as to incrementally feed the main body along the mandrel as the beveling head rotates.

While the motor is operating, exhaust air therefrom will exit the motor, into cooling air tube 15. The configuration of the tube carries the exhaust air from the motor to a connection at the main body 12, providing the air into the interior within the body. On entering the interior of the body 12, the air provides cooling to the device. The interior of the body, which may also be referred to as a gear box, suitably provides for expansion of the air, which furthers the cooling. At the opposite side of the main body from where the cooling air enters, it exits the main body through muffler 28. In the preferred embodiment which is shown, the muffler is mounted via a fitting elbow, substantially opposite to the side of the main body where the exhaust air from the motor s introduced. Other configurations may be employed, positioning the muffler at different locations.

Figure 3B:
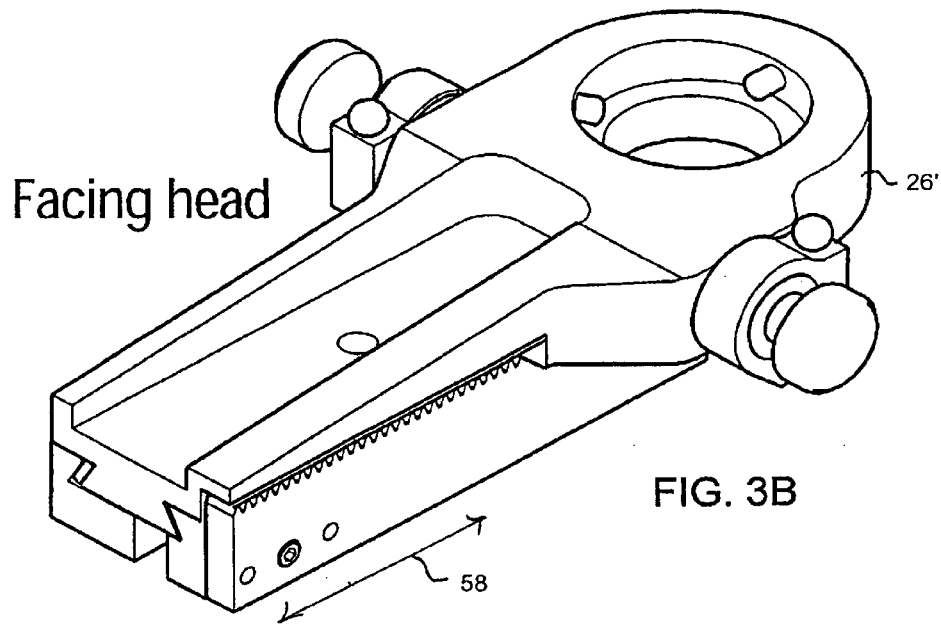
FIG. 3B is a perspective view of the facing head employed with the machine tool.
Figure 3A:
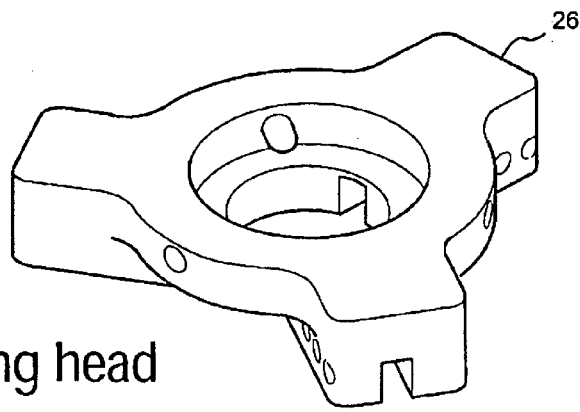
FIG. 3A is a perspective view of the beveling head employed with the machine tool.
Figure 4:
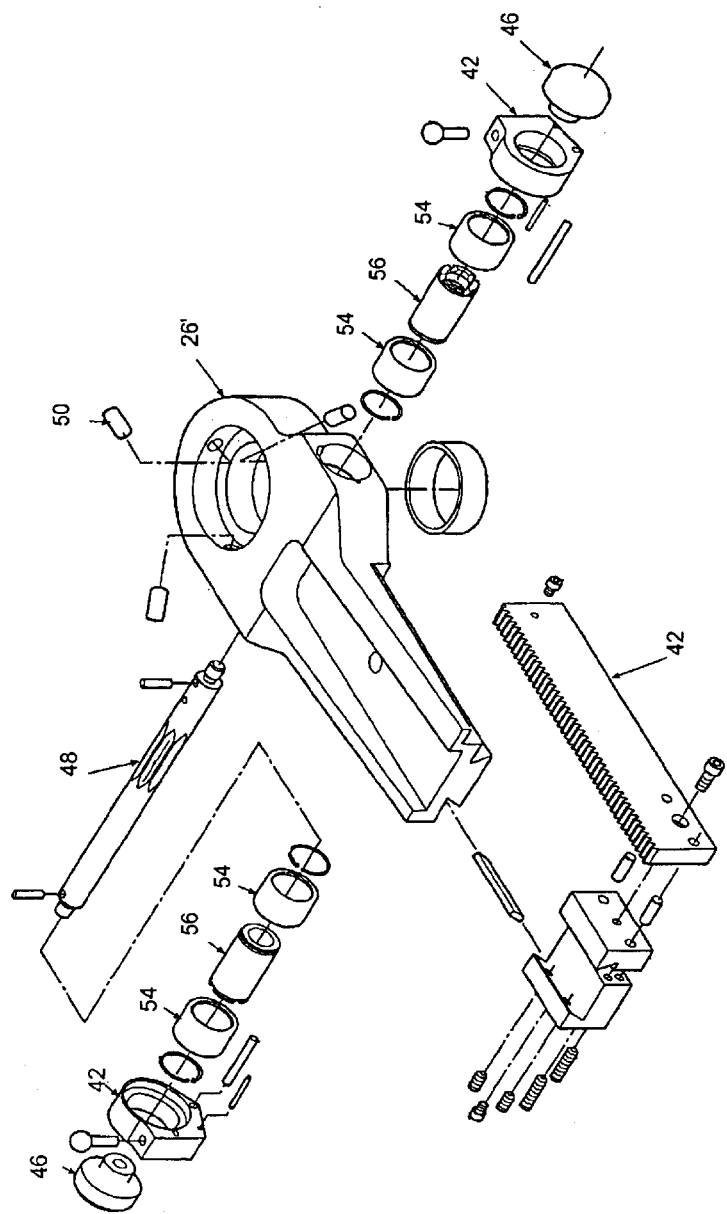
FIG. 4 is an exploded view of the facing head employed with the machine tool.

The illustrated beveling head 26 in FIG. 1, FIG. 2 and FIG. 3A is for performing a beveling operation, and suitably mounts to the main body via a bayonet fitting. Alternatively, a facing head 26', illustrated in FIG. 3B and FIG. 4, may be mounted so as to provide facing operations. The facing head 26' suitably feeds the cutting bit radially outwardly (or inwardly).

Components of the facing head comprise rack feed 42, lever feed 44 with knob 46. An axial feed pinion 48 cooperates with the rack 42 so as to provide feeding. Dowel pins 50 enable engagement with the feed body. A tool holder 52 translates along the facing head via its engagement with the rack. Rotation of the pinion to feed the rack is accomplished via roller clutch bearings 54 and feed direction bushings 56.

Thus, as the facing head rotates, operation of the components therewithin result in the controlled rotation of pinion 48 which cooperates with the rack to feed the cutting bit radially as indicated by arrow 58.

Thus, the air which powers the driving motor suitably also provides cooling to the overall device, which enables a more compact configuration to the device and enables the device to operate longer without overheating. Accordingly, in addition to the facing and cutting features, an advantage to the device is that it is integrally cooled using the exhaust from the air powering the device. The exhaust air is piped back into the main body or gear box of the device, where the air expands somewhat, cooling the device. Thus, a relatively compact configuration can be employed without over heating.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A method of cooling an air actuated machine tool comprising the steps of:
    employing exhaust air derived from actuating the machine tool to cool the machine tool,
    wherein said exhaust air is supplied from an exit point of an actuation motor to an interior portion of the machine tool via a supply tube communicated between the exit point and the interior portion, and
    wherein said employing step includes allowing expansion of the exhaust air within an interior portion of the machine tool to assist in the cooling thereof.

2. The method according to claim 1, further comprising the step of muffling said exhaust air.

3. The method according to claim 1, wherein said machine tool provides a facing operation.

4. The method according to claim 1, wherein said machine tool selectively provides a facing operation or a beveling operation.

5. The method according to claim 1, wherein said machine tool provides a beveling operation.

6. A cooling system for an air powered machine tool, comprising:
    an exhaust air re-director for capturing exhaust air from a driving motor and supplying it to a body of the air powered machine tool; and
    a chamber within said body for receiving said exhaust air as cooling air,
    wherein said driving motor exhausts air via an exhaust point adjacent a location where driving supply air is provided to said motor, and wherein said exhaust air re-director comprises a supply tube connected between said exhaust point and the body of the machine tool.

7. The cooling system according to claim 6, further comprising an exhaust from said body for enabling escape of the cooling air from said body after cooling thereof.

8. The cooling system according to claim 6, further comprising a muffler for muffling said cooling air escaping from said body.

9. The cooling system according to claim 6, wherein said chamber within said body comprises an expansion chamber enabling expansion of said exhaust air.

10. The cooling system according to claim 6, wherein said machine tool provides a facing operation.

11. The cooling system according to claim 6, wherein said machine tool provides a beveling operation.

12. An integrally cooled air powered machine tool, comprising:
    an exhaust air capture for capturing exhaust air at a capture location from a driving motor;
    an expansion chamber receiving said exhaust air and enabling expansion thereof to enable cooling thereof,
    wherein said capture location is at a position distal from a location where said driving motor transfers power to said machine tool, and
    wherein said exhaust air capture includes a transfer tube for transferring exhaust air from said capture location to said expansion chamber.

13. The integrally cooled air powered machine tool according to claim 12, wherein said expansion chamber is contained within a body of the machine tool.

14. The integrally cooled air powered machine tool according to claim 12, further comprising an exhaust from the body of the machine tool for enabling escape of the cooling air from said body after cooling thereof.

15. The cooling system according to claim 12, further comprising a muffler for muffling said exhausting cooling air.

16. The cooling system according to claim 12, wherein said machine tool provides a facing operation.

17. The cooling system according to claim 12, wherein said machine tool provides a beveling operation.

18. The cooling system according to claim 12, wherein said transfer tube comprises an externally mounted tubular member that includes a doubled back portion to redirect the exhaust air in an opposite direction from an initial exhaust direction.

19. The method according to claim 6, wherein, said exhaust air re-director comprises an externally mounted tubular member that includes a doubled back portion to redirect the exhaust air in an opposite direction from an initial exhaust direction.

20. The method according to claim 1, wherein, said supply tube comprises an externally mounted tubular member relative to the interior portion of the machine tool and includes a doubled back portion to redirect the exhaust air in an opposite direction from an initial exhaust direction.

* * * * *